United States Patent [19]

Clark

[11] 3,766,665

[45] Oct. 23, 1973

[54] ILLUMINABLE QUESTION AND ANSWER BOARD

[76] Inventor: James Arthur Clark, 2423 Virginia Beach Blvd., Norfolk, Va. 23504

[22] Filed: June 30, 1971

[21] Appl. No.: 121,645

[52] U.S. Cl............................................... 35/9 B
[51] Int. Cl. ............................................ G09b 7/02
[58] Field of Search ...................... 35/9 B, 9 C, 9 D

[56] References Cited
UNITED STATES PATENTS

| | | | |
|---|---|---|---|
| 3,070,904 | 1/1963 | Saba | 35/9 C |
| 3,137,079 | 6/1964 | Greuzard | 35/9 D |
| 1,949,783 | 3/1934 | Cleaver | 35/9 C |

Primary Examiner—Wm. H. Grieb

[57] ABSTRACT

The device includes a panel board having a plurality of questions and answers, and switches associated therewith. When a question switch is closed a red light is illuminated. When an answer switch is closed a green light is illuminated. If the answer switch represents the correct answer the red light will be extinguished. If it represents an incorrect answer the red light will remain illuminated.

6 Claims, 2 Drawing Figures

Patented Oct. 23, 1973

INVENTOR

JAMES A. CLARK

INVENTOR.
JAMES A. CLARK

ILLUMINABLE QUESTION AND ANSWER BOARD

The object of the invention is to provide a device for testing in education and educational games. Questions and answers may be programmed on any subject depending on the educational level of the participants.

Figure 1:
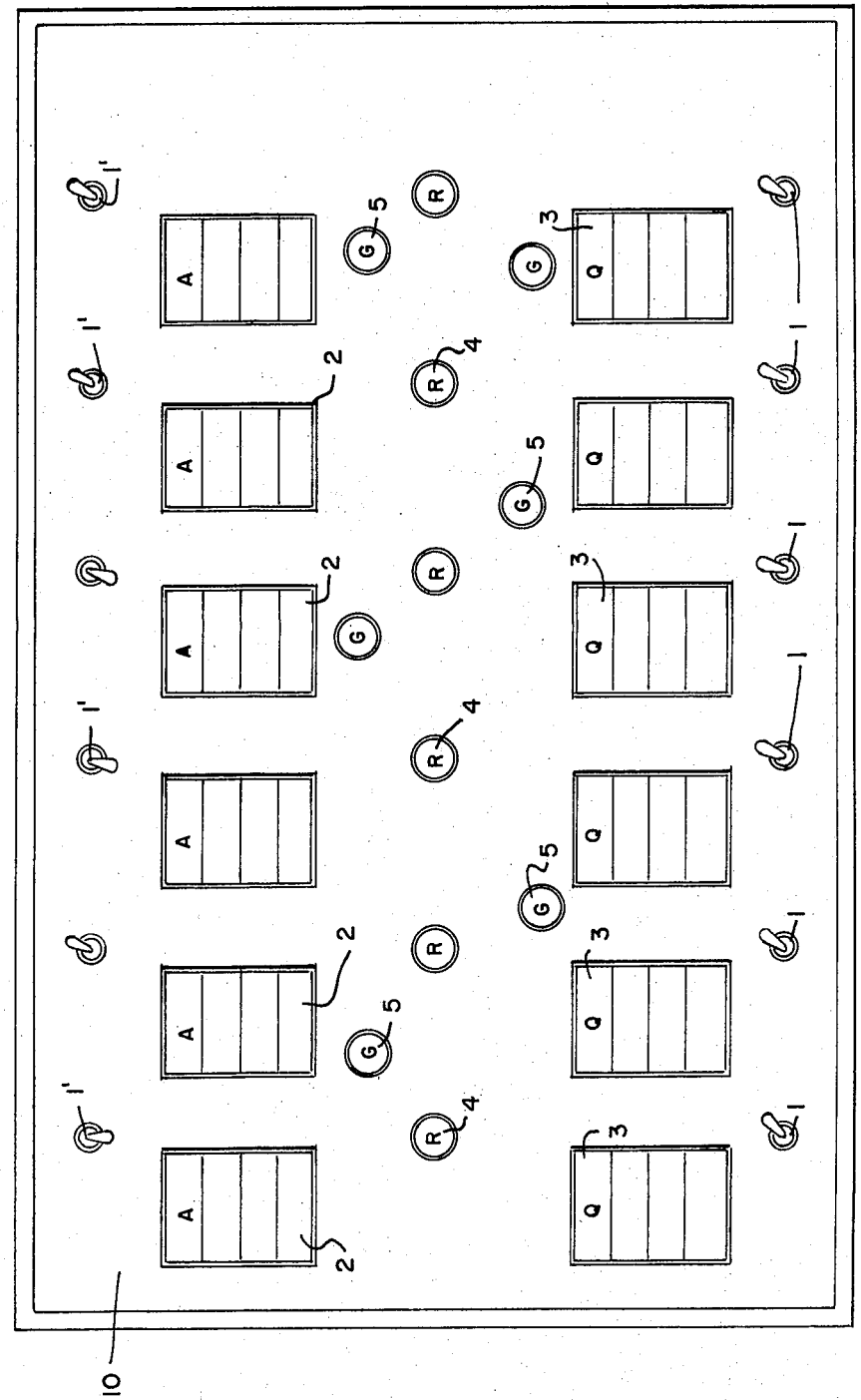
FIG. 1 is a view of the front panel of the device.

The device of this invention comprises a panel board with red question lights 4 and green answer lights 5, as shown in FIG. 1. There are six independent units with the same construction for each unit. At the bottom of the panel there are six question switches 1 connected with six answer switches 1' at the top of the panel. Thus there is a corresponding switch at the top and bottom for each independent unit. However the corresponding switches and their lights are not necessarily always diametrically opposite to each other. Each unit includes one battery 20.

A vertical column of questions 3 in separate slots is associated with each bottom switch 1. A vertical column of answers 2 in separate slots is associated with each top switch 1'.

Figure 2:
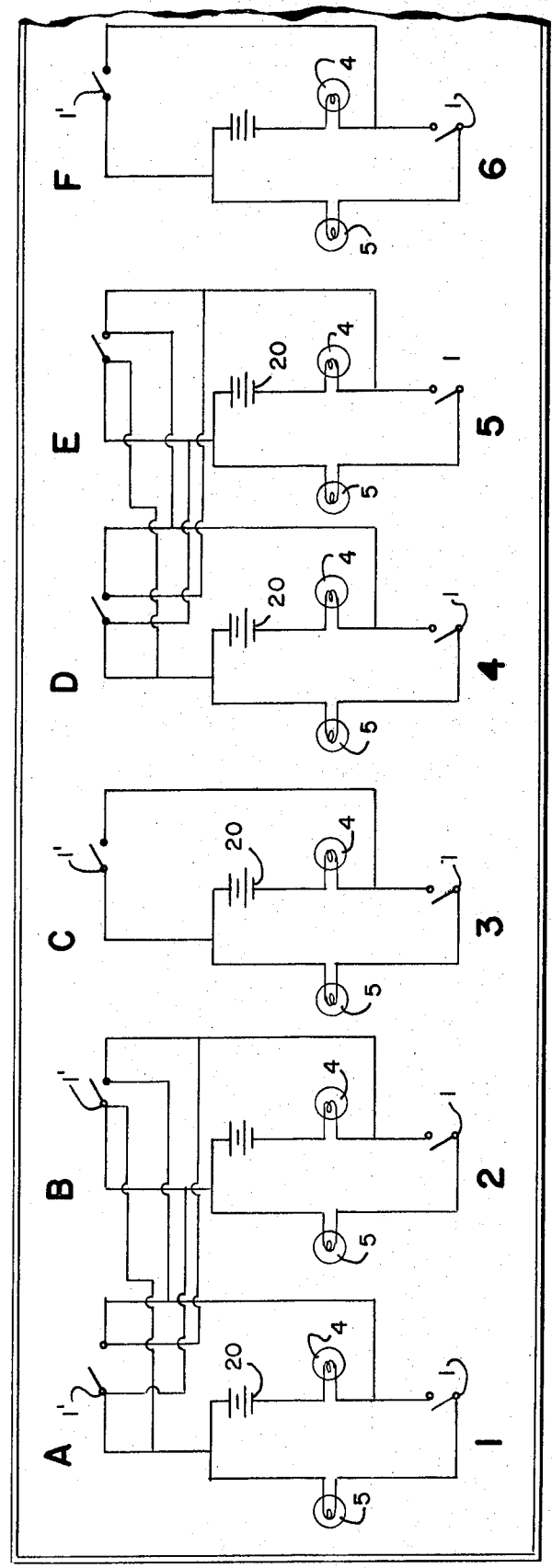
FIG. 2 is a view of the back panel and a wiring diagram of the device.

FIG. 2 shows the back of the panel and a wiring diagram of the device, including lights 4, 5 and their connections with the switches and batteries. In FIG. 2 the question portions of the units are labeled 1-6 and the answer portions are labeled A-F.

The device operates as follows. An operator selects a question in one of the question slots at the bottom of the panel board and closes the switch 1 associated with the selected question slot. This completes a circuit through a battery 20 to illuminate the red light 4 associated with the selected question slot. The operator then attempts to correctly answer the selected question by choosing one of the answers in one of the answer slots at the top of the panel board and closing the associated switch 1'. Upon closing any of the answer switches 1' a green light 5 will be illuminated somewhere on the board. If the correct answer switch was chosen the red light 4 which was previously illuminated by the closing of question switch 1 will be extinguished. However if an incorrect answer switch was chosen the red light 4 will remain illuminated. The operator then continues to choose answers and close answer switches 1' until he finds the switch which will extinguish the illuminated red light 4. This indicates to the operator that he has found the correct answer.

The operator may check his correct answer by switching off the answer switch 1'. This action will extinguish the green light 5 and turn back on the red light 4. He can then turn back on the switch 1' associated with the correct answer and the green light will be illuminated and the red light will automatically be extinguished.

I claim:

1. An illuminatable question and answer device comprising:

a board having a plurality of question areas and an equal plurality of answer areas, each of said areas having means for displaying at least one question or answer therein;

each of the answers being correct for one of the questions and incorrect for the rest of the questions;

first electrical switch means associated with each of said question areas;

second electrical switch means associated with each of said answer areas;

a plurality of first illuminating means equal in number to the plurality of question areas;

a plurality of second illuminating means equal in number to the plurality of answer areas;

first circuit means for energizing one of said first illuminating means upon the closing of one of said first switch means;

second circuit means for energizing one of said second illuminating means upon the closing of one of said second switch means;

said second circuit means additionally de-energizing said one first illuminating means upon the closing of the one second switch means which is associated with the correct answer to the question associated with the first switch means.

2. The device of claim 1 wherein the first illuminating means are red lights and the second illuminating means are green lights.

3. The device of claim 1 wherein the question areas are arranged along the lower half of the board and the answer areas are arranged along the upper half of the board.

4. The device of claim 3 wherein at least two of the answer areas are not directly above their related question areas.

5. The device of claim 1 wherein the first illuminating means are arranged in a horizontal row across the center of the board.

6. The device of claim 1 wherein each of said question and answer areas include means for displaying a plurality of questions and answers, respectively.

* * * * *